United States Patent Office 3,204,169
Patented Aug. 31, 1965

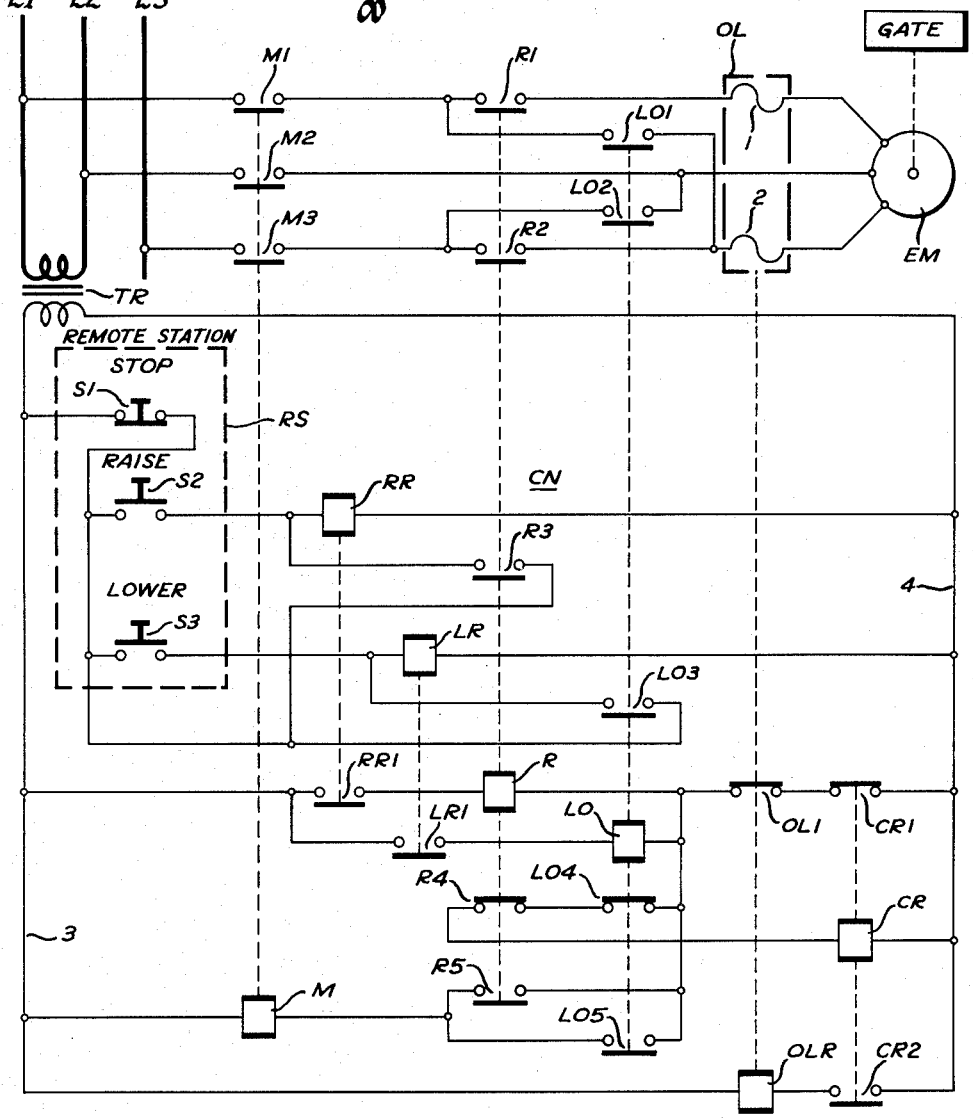

3,204,169
REMOTE CONTROL SYSTEM
Richard R. Ranson, Milwaukee, Wis., assignor to Cutler-Hammer, Inc., Milwaukee, Wis., a corporation of Delaware
Filed Mar. 13, 1962, Ser. No. 179,313
5 Claims. (Cl. 318—264)

This invention relates to remote control electrical systems and more particularly to systems controllable from a remote station and comprising load protecting means and means whereby an operator at the remote station is informed that such protective means has responded to an abnormal condition.

While not limited thereto, the invention is especially applicable to motor control and protective systems for informing an operator at a remote station whenever motor operation is initiated whether an abnormal electrical condition has occurred.

An object of the invention is to provide an improved remote control system.

A more specific object of the invention is to provide a motor control system having a remote control station with improved means for informing an operator whether an abnormal electrical condition has occurred.

Another specific object of the invention is to provide a motor control system normally requiring a single switch-on operation to start the motor but requiring two successive switch-on operations to start the motor after an overload protective device has tripped whereby an operator at a remote station is advised when the first switch-on operation does not start the motor that an abnormal condition has occurred.

Another specific object of the invention is to provide a motor control system having a control station and overload protective devices with improved means responsive to closure of a motor starting switch when an overload protective device has not tripped for energizing the motor and being responsive to closure of such motor starting switch when an overload protective device has tripped for resetting such overload protective device without energizing the motor thereby informing the operator that an abnormal electrical condition has occurred, energization of the motor following such resetting requiring opening and reclosure of such motor starting switch.

A further specific object of the invention is to provide a simple and reliable motor control system whereby an operator at a remote station can control the motor and reset an overload protective device following tripping thereof.

Other objects and advantages of the invention will hereinafter appear.

According to the invention, there is provided an alternating current motor of the three-phase type. The motor is illustrated as being adapted for alternately raising and lowering a movable gate of a dam. For this purpose, the motor is provided with a control system having a "raise" contactor and a main power contactor for connecting the motor to a three-phase electrical power supply source whereby to energize the motor for rotation in one direction. A "lower" contactor and the main power contactor connect the motor to the power supply source whereby to energize the same for rotation in the opposite direction. The raise and lower contactors are controlled by respective raise and lower control relays. A control station mounted at a remote location is provided with raise and lower switches for controlling the aforementioned reverse energizations of the motor and is also provided with a stop switch. The motor is provided with an overload protective device having coils connected to at least two of its primary terminals. To afford resetting of the overload protective device from the remote control station there is provided a reset coil and a control relay. The reset coil and control relay are connected in the control system so that they are normally ineffective but become effective after the overload protective device trips. That is, depressing of a raise or lower switch normally causes corresponding motor operation. However, after the overload protective device trips, depressing of such switch causes resetting of the overload protective device. The switch must be pressed a second time to energize the motor. The fact that the motor does not start when the switch is pressed the first time indicates to the operator that the overload protective device had tripped.

These and other objects and advantages of the invention and the manner of obtaining them will best be understood by reference to the following detailed description of an embodiment of a remote control system taken in conjunction with the accompanying drawings, wherein:

The single figure diagrammatically illustrates a remote control system constructed in accordance with the invention.

Referring to the drawing, there is shown a control system for a three-phase alternating current induction motor EM which is adapted to raise and lower a gate. Motor EM is energized from a three-phase alternating current power supply source which is connectable to lines L1, L2 and L3. Line L1 is connected through normally open contacts M1 and R1 of main contactor M and "raise" contactor R, respectively, and coil 1 of a magnetic trip overload relay OL to a first terminal of motor EM. Line L2 is connected through normally open contact M2 of main contactor M to a second terminal of the motor. Line L3 is connected through normally open contacts M3 and R2 of main contactor M and "raise" contactor R, respectively, and through coil 2 of overload relay OL to a third terminal of the motor.

A reversing circuit is provided by the connection of the junction of contacts M1 and R1 through a normally open contact LO1 of a "lower" contactor LO to the junction of contact R2 and coil 2 and the connection of the junction of contacts M3 and R2 through a normally open contact LO2 of "lower" contactor LO to the junction of contact M2 and the second terminal of the motor.

Lines L1 and L2 are also connected across the primary winding of a transformer TR, the opposite ends of a secondary winding of such transformer being connected to conductors 3 and 4, respectively. A control network CN is connected for energization across conductors 3 and 4, such control network being under the control of a remote station RS.

Control network CN comprises the aforementioned main contactor M, "raise" contactor R and "lower" contactor LO. Control network CN is further provided with a "raise" relay RR, a "lower" relay LR, a control relay CR and an overload relay reset coil OLR for overload relay OL. Remote station RS is provided with a stop switch S1, a "raise" switch S2 and a "lower" switch S3, these switches being of the manual pushbutton type or the like. The operating coil of raise relay RR is connected across supply conductors 3 and 4 through stop switch S1 and "raise" switch S2 in series. A maintaining circuit for the operating coil of "raise" relay RR extends through normally open contact R3 of "raise" contactor R in shunt of "raise" switch S2. The operating coil of "lower" relay LR is connected across supply conductors 3 and 4 through stop switch S1 and "lower" switch S3 in series. A maintaining circuit for the operating coil of relay LR extends through normally open contact LO3 of "lower" contactor LO in shunt of lower switch S3. The operating coil of main contactor M is connected across supply conductors 3 and 4 through normally closed contacts OL1 and CR1 of overload relay OL and control relay CR, respectively, in series connection and normally open contacts R5 and LO5 of "raise" contactor R and "lower" contactor LO, respectively, the latter two contacts R5 and LO5 being in parallel connection in the circuit of the operating coil of the main contactor. The operating coil of "raise" contactor R is connected across supply conductors 3 and 4 through normally open contact RR1 of "raise" relay RR and normally closed contacts OL1 and CR1. The operating coil of "lower" contactor LO is connected across supply conductors 3 and 4 through normally open contact LR1 of lower relay LR and contacts OL1 and CR1. The operating coil of control relay CR is connected to supply conductor 4 and through normally closed contacts R4 and LO4 of "raise" contactor R and "lower contactor LO, respectively, where it divides. One branch extends through the operating coil of "raise" contactor R and normally open contact RR1 of "raise" relay RR to supply conductor 3. The other branch extends through the operating coil of "lower" contactor LO and normally open contact LR1 of "lower" relay LR to supply conductor 3. Overload reset coil OLR is connected across supply conductors 3 and 4 through normally open contact CR2 of control relay CR.

The operation of the system of FIGURE 1 will now be described.

Let it be assumed that a three-phase power supply source is connected to power supply lines L1, L2 and L3. As a result, supply conductors 3 and 4 are energized through transformer TR. To operate motor EM in the forward direction, "raise" switch S2 is pressed to close its contact and complete an energizing circuit for the operating coil of "raise" relay RR through stop switch S1. Contact RR1 closes and completes an energizing circuit for the operating coil of "raise" contactor R through contacts OL1 and CR1. Contacts R1 and R2 in the motor circuit close. Contact R3 closes to complete a maintaining circuit for the operatipg coil of "raise" relay RR in shunt of "raise" switch S2 whereupon the latter may be released. Contact R4 opens to interrupts the energizing circuit of the operating coil of control relay CR. Contact R5 closes to complete an energizing circuit for the operating coil of main contactor M through contacts OL1 and CR1. Contacts M1, M2 and M3 close to connect motor EM to the power supply source and to initiate operation thereof to raise the gate.

To stop the motor, stop switch S1 is pressed to interrupt the maintaining circuit for the operating coil of "raise" relay RR extending through contact R3. Contact RR1 opens to interrupt energization of "raise" contactor R. Contacts R1 and R2 open to disconnect motor EM from the power supply source. Contact R5 opens to interrupt energization of the operation coil of main contactor M. Contacts M1, M2 and M3 open to further disconnect motor EM from the power supply source. The motor stops.

Let it be assumed that motor EM is running in the forward direction as hereinbefore described and that due to an overload condition either or both of coils 1 and 2 of overload relay OL are energized to open contact OL1. This interrupts energization of contactors M and R. Contacts R1, R2, M1, M2 and M3 open to disconnect the motor from the power supply source. Contact R3 opens to interrupt the maintaining circuit for relay RR. Contacts R5 and RR1 open and contact R4 closes.

To reset overload relay OL, "raise" switch S2 is pressed to close its contacts and to complete an energizing circuit for the operating coil of relay RR. Contact RR1 closes to complete an energizing circuit for the operating coil of control relay CR through the operating coil of contactor R and contacts LO4 and R4 across supply conductors 3 and 4. Contact CR1 opens to prevent short circuiting and consequent deenergization of the operating coil of relay CR. Contact CR2 closes to complete an energizing circuit for overload reset coil OLR across supply conductors 3 and 4. Overload reset coil OLR recloses contact OL1. Under this condition, the operating coils of relays RR and CR and reset coil OLR remain energized as long as switch S2 is maintained closed. Due to the voltage drop in the operating coil of relay CR, the operating coil of "raise" contactor R does not energize in series therewith and the maintaining circuit for the operating coil of relay RR through contact R3 is not completed. When switch S2 is released to open its contact, the operating coil of relay RR is deenergized. Contact RR1 opens to deenergize the operating coil of relay CR and contact CR2 opens to deenergize reset coil OLR. Contact OL1 remains closed. This returns the circuit to its normal condition shown in the drawing wherein it is ready for another operation of the motor.

To operate the motor in the reverse direction, "lower" switch S3 is pressed to close its contact and complete an energizing circuit through stop switch S1 for the operating coil of "lower" relay LR. Contact LR1 closes to complete an energizing circuit for lower contactor LO through contacts OL1 and CR1. Contacts LO1 and LO2 close to complete points in the reverse energizing circuit of the motor. Contact LO3 closes to complete a maintaining circuit for the operating coil of relay LR in shunt of switch S3. Contact LO4 opens to prevent energization of the operating coil of relay CR and contact LO5 closes to complete an energizing circuit for the operating coil of main contact M through contacts OL1 and CR1. Contact M1, M2 and M3 close to connect the motor to the power supply source for operation in the reverse direction. To stop the motor, stop switch S1 is momentarily pressed to interrupt energization of relay RR, contactor LO and contactor M thereby to disconnect the motor from the power supply source.

If an overload condition occurs, overload relay OL operates as hereinbefore described to open contact OL1. As a result, contactors LO and M are deenergized to disconnect the motor from the power supply source. Contact LO3 opens to deenergize the operating coil of relay LR.

To reset the overload relay, switch S3 is momentarily pressed to close its contact and to energize the operating coil of relay LR. Contact LR1 closes to complete an energizing circuit for the operating coil of relay CR through the operating coil of contactor LO and contacts LO4 and R4. Relay CR has a smaller coil than contactor R or LO and functions as hereinbefore described to energize reset coil OLR thereby to close contact OL1. The operating coil of contactor LO is larger than and does not energize in series with the operating coil of relay CR. Thus, when switch S3 is released, the operating coils of relays LR and CR and reset coil OLR are denergized to return the system to the normal condition shown in the drawing wherein it is ready for further operation of the motor by pressing either switch S2 or S3. It will be apparent that the overload relay can be reset to close contact OL1 by momentarily pressing either switch S2 or S3. It will also be apparent that resetting of the overload relay does not cause reoperation of the motor. Instead, either switch S2 or S3 must be pressed to reset the overload relay following which the appropriate switch S2 or S3 must be pressed to operate the motor in the desired direction.

From the foregoing description, it will be apparent that all of the necessary control functions of the motor can be performed from the remote station RS. The motor can be operated in either the forward or reverse direction by pressing switch S2 or S3 to raise or lower the gate on the dam. The motor can be stopped by pressing switch S1. If the overload relay trips, the operator at the remote station will be informed of this when restarting of the motor is attempted. Thus, failure of the motor to start when either switch S2 or S3 is pressed informs the operator that an overload condition has occurred. The operator at the remote station can reset the overload relay by pressing either switch S2 or S3. Release of such switch and a second depressing thereof or pressing of the other switch causes motor operation.

While the system hereinbefore described is effectively adapted to fulfill the objects stated, it is to be understood that I do not intend to confine my invention to the particular preferred embodiment of remote control system disclosed, inasmuch as it is susceptible of various modifications without departing from the scope of the appended claims.

I claim:
1. A remote control system comprising:
 (a) a power supply source;
 (b) an electroresponsive load;
 (c) and means for connecting said load to said source to cause energization thereof comprising:
 (d) a control circuit;
 (e) a remote station connected for controlling said control circuit;
 (f) protective means responsive to an abnormal electrical condition in said system for operating said control circuit to cause disconnection of said load from said source, said protective means having a tripped condition which it assumes in response to such abnormal condition and an alternative reset condition wherein said control circuit is operable to control energization of the load;
 (g) said remote station comprising switch means effective upon first switch-on operation thereof when said protective means is in its reset condition to cause operation of said connecting means and thereby to energize said load;
 (h) and means in said control circuit effective when said protective means is in its tripped condition for causing operation of said protective means to its reset condition in response to a similar first switch-on operation of said switch means without energizing said load thereby to indicate to the operator that an abnormal condition has occurred.

2. In a motor control system in combination:
 (a) a power supply source;
 (b) a motor;
 (c) means for connecting said motor to said source to cause operation thereof comprising a control circuit and a remote station connected for controlling said control circuit;
 (d) and protective means responsive to a motor overload condition for operating said control circuit to cause disconnection of the motor from said source, said protective means having a tripped position which it assumes in response to such overload condition and in which it remains and a reset position wherein said control circuit is operable to control energization of the motor;
 (e) said remote station comprising a switch normally operable when said protective means is in its reset position to operate said control circuit to cause energization of the motor;
 (f) and said control circuit comprising means responsive to first closure of said remote switch when said protective means is in its tripped position for resetting said protective means without energizing said motor thereby to indicate to the remote operator that an overload condition has occurred, means responsive to another closure of said remote switch following resetting of said protective means for operating said connecting means to energize the motor.

3. A system for controlling a motor from a remote location comprising:
 (a) a control station at a remote location comprising a switch;
 (b) a control circuit connected to said switch and comcomprising means responsive to closure of said switch for connecting the motor to an electrical power supply source;
 (c) means tripping in response to a motor overload condition for operating said means thereby to disconnect the motor from the power supply source;
 (d) electroresponsive reset means for said overload means;
 (e) control means for said reset means, said control means being normally ineffective when said overload means is reset;
 (f) means responsive to closure of said switch while said overload means is tripped for operating said control means to cause resetting of said overload means;
 (g) and means responsive to operation of said control means for preventing operation of said connecting means;

4. The invention defined in claim 3, wherein said preventing means responds to reopening of said switch to recondition said connecting means for operation on the next closure of said switch.

5. A system for controlling a reversible motor from a remote location comprising:
 (a) a control station at a remote location having a pair of switches selectively operable for controlling reverse rotations of the motor;
 (b) first means responsive to closure of a first one of said switches for causing energization of the motor for rotation in one direction;
 (c) second means responsive to closure of the other switch alternatively for causing energization of the motor for rotation in the other direction;
 (d) overload protective means in the motor energizing circuit tripping in response to an overload condition for deenergizing the energized one of said first and second means thereby to deenergize the motor and for preventing reenergization of either said first or second means until said overload means is reset;
 (e) normally ineffective resetting control means rendered effective in the tripped condition of said overload means and being responsive to first closure of either one of said switches for causing resetting of said overload means and for preventing operation of said first or second means until after the closed switch is reopened;
 (f) and said first and second means being responsive to selective second closure of a switch for causing energization of the motor for rotation in the selected direction.

References Cited by the Examiner
UNITED STATES PATENTS 2,310,139  2/43  Wickerham ———————— 318—474 X
2,405,053  7/46  Posselt ———————————— 318—264 X
3,075,134  1/63  Manney ———————————— 318—476

ORIS L. RADER, *Primary Examiner.*